Patented Feb. 19, 1935

1,991,402

UNITED STATES PATENT OFFICE 1,991,402

PROCESS OF THICKENING LATEX

John McGavack, Leonia, N. J., assignor, by mesne assignments, to United States Rubber Company, New York, N. Y., a corporation of New Jersey No Drawing. Application October 10, 1933, Serial No. 692,990

4 Claims. (Cl. 18—50)

This invention relates to the compounding of rubber latex, and more particularly to a process of thickening latex in such manner as to substantially avoid any increase in the water content thereof.

In the usual methods of compounding latex, either normal or concentrated, to produce vulcanizable or other latex compositions, the vulcanizing and/or other ingredients, such as accelerators, sulphur, zinc oxide, fillers, and dyes or pigments, and the like, are first mixed with water, with or without the addition of dispersing and/or stabilizing agents to form an aqueous dispersion or paste thereof which then may be added to the latex. Relatively small amounts of water are generally sufficient for the preparation of such pastes, it being possible generally to prepare stable pastes of at least 40 to 60% solids content, so that the addition of such pastes to latex does not materially alter the water content of the latex relative to the total solids content. Likewise it is often desirable to add thickening agents to the latex. In certain cases it may be permissible to employ as thickening agents small amounts of substances which function by agglomerating, destabilizing, or partially coagulating the latex particles, such as certain metal salts, in which case the substances may generally be added to the latex in the form of a concentrated aqueous solution or dispersion without substantially increasing the water content of the latex. In other instances, however, it is desirable to thicken the latex while avoiding the addition of destabilizing or other similar agents. In such cases it is customary to add to the latex dilute aqueous solutions or dispersions of hydrophilic substances, for example colloidal clays, casein, glue, gelatine, or vegetable gums such as gum tragacanth, Irish moss, karaya gum, alginates, pectin bodies and the like, or soluble silicates such as sodium silicate. Aqueous solutions or dispersions of such substances, in order to remain fluid, are usually prepared in concentrations of not more than 10% and in some cases of not more than about 1%. Since the amounts of such substances which are commonly employed for the thickening of latex range from 1 to 15% by weight of the dry solids of the latex, it is obvious that the thickening of the latex by means of such agents is accomplished only at the expense of substantial dilution of the latex, the water content of the latex often being increased by as much as 50% or more.

The present invention relates to a process of thickening a latex by the addition of hydrophilic thickening agents without substantially diluting the latex with water. By the process of the present invention, the thickening of the latex is effected by removing a portion of the aqueous phase of the latex without coagulation of the dispersed rubber particles, introducing the desired hydrophilic thickening agent into at least a portion of the removed aqueous phase, and incorporating the resulting solution or dispersion into the latex. In this manner as much hydrophilic thickening agent as is required to thicken the latex to the desired extent may be incorporated therein without any substantial increase in the water content of the latex. Obviously the whole of the water removed need not be returned to the latex with the thickening agent, a portion thereof being sometimes sufficient for the proper introduction of the desired amount of thickening agent. In such case there may result a concentration as well as thickening of the latex.

The method of this invention is particularly efficacious in the thickening of commercial latices of so-called "normal" solids content, i. e., latices having a solids content of from 32% to 36%. The method obviates the uneconomical use of the more expensive latex concentrates which would otherwise have to be employed in order to produce a thickened latex having an ultimate desired solids content lower than that of the concentrates commercially available. The method, however, is equally applicable both to latices of normal or lower solids content, and to latices of higher concentration from which a portion of the water may conveniently be removed without coagulation of the rubber. Unvulcanized or so-called vulcanized latices may be thickened by the present invention, and the term "latex" is intended to include the same.

In carrying out the present invention, the desired amount of aqueous phase may be removed from the latex in any manner well known in the art. It has been found, for example, rapid and convenient to employ well known creaming operations for this purpose, either a mechanical creaming, sometimes called centrifuging, or a chemical creaming resulting from the introduction of a suitable amount of a chemical creaming agent into the latex, or both. In the customary methods of concentrating latex by creaming, it is generally the aim to produce a cream having the highest possible rubber content, viz., upwards of 60%, and to remove as much as possible of the rubber from the serum by the creaming operation. For this purpose in chemical creaming operations, it is usually necessary to allow the latex, to which has been added a proper amount of a creaming agent, to stand for from 24 to 96 hours before recovering the concentrated cream. In the method of the present invention, however, a partial creaming, requiring but a few hours' standing following the addition of the creaming agent, is usually sufficient to provide enough serum for preparing the desired solution of the thickening agent. In the case of a mechanical creaming, a partial creaming as by centrifuging only a portion of the latex will generally give sufficient serum for the addition of the thickening agent. For example, the whole or a portion of a latex capable of being creamed is creamed by means of centrifuging the same and/or introducing a small amount, generally less than 0.5% based on the rubber solids, of a creaming agent, for example, ammonium alginate, pectin, locust bean gum, Irish moss, or the like. If the creaming is accompanied by the addition of a chemical creaming agent, such creaming agent is first dissolved or suspended in a small amount of water in the usual manner, or in a small amount of serum from a previous creaming operation, but the amount of water or serum thus introduced, by virtue of the small amount of creaming agent necessary to effect the creaming, does not substantially dilute the latex. As soon as sufficient serum has separated, which may be in very much less time than is necessary for maximum creaming, the creaming may be interrupted, and the serum recovered, the hydrophilic thickening agent being added to a part or the whole of the serum, and the thickened serum being returned to the cream. Thus an amount of hydrophilic material sufficient for thickening the latex may be introduced into the latex without lowering the total solids content of the latex or the proportion of rubber solids to the aqueous phase.

As a specific illustration of one manner of carrying out the invention, but without intention to limit the invention except as required by the prior art, the following example is included: To 1000 grams of normal latex containing 36% solids was added 1.08 grams of locust bean gum in the form of a 1½% solution. Locust bean gum, similarly to other vegetable mucilages, may act as a chemical creaming agent in small amounts and as a thickening agent in larger amounts. The latex thus treated was allowed to stand until a substantial separation into two layers was effected, the volume of the lower or serum layer being about 35 to 40% of that of the original latex. The serum was removed and to the same was added approximately 5.4 grams of locust bean gum. The mixture was stirred and heated to aid in dissolving the gum, and the thickened serum and the cream were then mixed, resulting in a substantially undiluted highly viscous thickened latex. The example above described the creaming of a normal latex containing 36% solids but it is well known that latices between 36% and 50% are capable of creaming, or further creaming if they have resulted from a previous creaming operation, as well as are more dilute latices. It is obvious that additional compounding ingredients such as curatives, fillers and the like may also be incorporated into the solution of the hydrophilic colloidal thickening agent in order to produce thickened vulcanizable or otherwise compounded latex compositions, or the usual pastes of such materials may be added to the latex separately.

As various modifications will occur to those skilled in the art, it is not intended to limit the invention other than as set forth in the appended claims.

Having thus described my invention, what I claim as new and desire to protect by Letters Patent is:

1. The process of thickening a latex without substantially diluting said latex with water comprising removing a portion of the aqueous phase of said latex, without coagulation of the dispersed rubber particles in the residual rubber-rich portion, introducing a hydrophilic thickening agent into at least a portion of the removed aqueous phase, and mixing the thus treated aqueous phase with the residual rubber-rich portion of the latex.

2. The process of thickening a latex, capable of being creamed, without substantially diluting said latex with water, comprising at least partially creaming said latex, introducing a hydrophilic thickening agent into at least a portion of the serum, and mixing the thus treated serum with the cream portion.

3. The process of thickening a latex, capable of being creamed, without substantially changing the proportion of rubber solids to aqueous phase, comprising at least partially creaming said latex, introducing a hydrophilic thickening agent into the serum portion, and mixing the thus treated serum portion with the cream portion.

4. The process of thickening a latex, capable of being creamed, without substantially diluting said latex with water, comprising at least partially chemically creaming said latex with a small amount of a hydrophilic colloid which in larger amounts is a thickening agent for latex, introducing additional amounts of said hydrophilic colloid into at least a portion of the serum, and mixing the thus treated serum with the cream portion.

JOHN McGAVACK.